(12) United States Patent
Germagian et al.

(10) Patent No.: US 6,894,622 B2
(45) Date of Patent: *May 17, 2005

(54) METHOD AND APPARATUS FOR DELIVERING UNINTERRUPTED POWER

(75) Inventors: Mark H. Germagian, Hudson, MA (US); Benjamin J. Beck, Boston, MA (US); Andrew R. Woodward, Hyde Park, MA (US)

(73) Assignee: American Power Conversion Corporation, West Kingston, RI (US)

( * ) Notice: Subject to any disclaimer, the term of this patent is extended or adjusted under 35 U.S.C. 154(b) by 9 days.

This patent is subject to a terminal disclaimer.

(21) Appl. No.: 10/302,795

(22) Filed: Nov. 22, 2002

(65) Prior Publication Data

US 2003/0147262 A1 Aug. 7, 2003

Related U.S. Application Data

(63) Continuation of application No. 09/758,047, filed on Jan. 10, 2001, now Pat. No. 6,486,789, which is a continuation of application No. 09/392,129, filed on Sep. 8, 1999, now abandoned.

(51) Int. Cl.[7] ............................................. G08B 23/00
(52) U.S. Cl. ................. 340/693.5; 340/693.1; 340/636
(58) Field of Search .................... 340/693.1, 693.5, 340/636, 635, 693.28; 307/40, 140, 147, 11, 23, 64, 65; 315/33, 86, 87; 439/131, 142, 557; 174/48, 55; D13/109, 110

(56) References Cited

U.S. PATENT DOCUMENTS

| | | |
|---|---|---|
| D122,482 S | 9/1940 | Fletcher ..................... D13/109 |
| D134,818 S | 1/1943 | Fletcher ..................... D13/109 |
| D142,475 S | 10/1945 | Gaguski ..................... D13/184 |
| 2,978,596 A | 4/1961 | Robirds ...................... 307/151 |
| 2,988,655 A | 6/1961 | Rudolph et al. ............ 307/114 |
| 3,056,893 A | 10/1962 | Russ .......................... 307/150 |
| D218,441 S | 8/1970 | Siegel ........................ D13/110 |
| 3,636,236 A | 1/1972 | Smith .......................... 174/66 |
| D225,581 S | 12/1972 | Danti et al. ................ D13/110 |
| 3,760,235 A | 9/1973 | Takami et al. .............. 361/724 |
| D240,836 S | 8/1976 | Corvette .................... D13/109 |
| D280,318 S | 8/1985 | Barone ....................... D13/110 |
| 4,627,684 A | 12/1986 | D'Amato .................... 439/892 |
| 4,717,358 A | 1/1988 | Chaundy .................... 439/557 |
| 4,749,908 A | 6/1988 | Stifter ......................... 315/86 |
| 4,873,600 A | 10/1989 | Vogele ....................... 361/823 |
| D316,396 S | 4/1991 | Decosse et al. ............ D13/110 |
| 5,007,860 A | 4/1991 | Robinson et al. ......... 439/540.1 |
| 5,122,069 A | 6/1992 | Brownlie et al. ........... 439/131 |
| D329,618 S | 9/1992 | Hollander et al. ........... D10/52 |
| 5,177,325 A | 1/1993 | Giammanco ................ 174/50 |
| 5,180,886 A | 1/1993 | Dierenbach et al. ......... 174/56 |
| D341,124 S | 11/1993 | Krokaugger ............... D13/123 |
| 5,272,459 A | 12/1993 | Geery ......................... 336/61 |

(Continued)

FOREIGN PATENT DOCUMENTS

EP    0 765 023 A2    3/1997

OTHER PUBLICATIONS

International Search Report dated Apr. 23, 2001.

*Primary Examiner*—Van T. Trieu
(74) *Attorney, Agent, or Firm*—Mintz, Levin

(57) ABSTRACT

An uninterruptible power supply that provides power to an electrical device, the uninterruptible power supply that includes a first housing; a cover plate that includes a plurality of electrical outlets located on a surface of the cover plate and said cover plate is connected to the first housing in an angled position; and a battery in electrical communication with the plurality of electrical outlets on the surface of the cover plate, and the battery being removably attached to the first housing.

26 Claims, 6 Drawing Sheets

U.S. PATENT DOCUMENTS

| | | | |
|---|---|---|---|
| 5,277,620 A | 1/1994 | Taylor | 439/490 |
| 5,334,052 A | 8/1994 | Chen | 439/650 |
| 5,384,428 A | 1/1995 | Luu | 174/66 |
| D374,809 S | 10/1996 | Scherer et al. | D8/353 |
| D378,577 S | 3/1997 | Peroni | D10/103 |
| 5,645,449 A | 7/1997 | Sabo | 439/540.1 |
| 5,701,244 A | 12/1997 | Emmert et al. | 363/146 |
| D391,554 S | 3/1998 | Latchaw | D13/184 |
| 5,744,750 A | 4/1998 | Almond | 174/49 |
| D394,424 S | 5/1998 | Wachter | D13/110 |
| 5,768,097 A | 6/1998 | Jelinger | 361/683 |
| 5,793,627 A * | 8/1998 | Caldes et al. | 307/64 |
| 5,980,279 A | 11/1999 | Müller | 439/142 |
| 5,995,400 A * | 11/1999 | Park et al. | 307/64 |
| 6,486,789 B2 * | 11/2002 | Germagian et al. | 340/693.5 |

* cited by examiner

METHOD AND APPARATUS FOR DELIVERING UNINTERRUPTED POWER

RELATED APPLICATION

This application is a continuation application under 37 C.F.R. 1.53(b) of U.S. Ser. No. 09/758,047, filed Jan. 10, 2001 (U.S. Pat. No. 6,486,789), which is a continuation of U.S. Ser. No. 09/392,129, filed Sep. 8, 1999 now abandoned, which are incorporated herein by reference.

FIELD OF THE INVENTION

Embodiments of the present invention are directed to a method and an apparatus for delivering uninterrupted power to an electrical device. More specifically, embodiments of the present invention are directed to an uninterruptible power supply having a removable cover plate, and a method of manufacturing the uninterruptible power supply.

BACKGROUND OF THE INVENTION

The use of uninterruptible power supplies (UPSs) having battery back-up systems to provide regulated, uninterrupted power for sensitive and/or critical loads, such as computer systems, and other data processing systems is well known.

Uninterruptible power supplies are used to protect sensitive electronic equipment against disturbances which can occasionally appear on the public electricity supply network. These disturbances can vary from voltage changes of very short duration to total loss of supply for a considerable period, resulting in the loss of computer data and, in some instances, actual damage to electrical equipment.

In addition, there are a multiplicity of electronic devices that might benefit from an uninterruptible power supply that includes power surge protection. These devices include computers and computer peripherals that are often co-located in a small area. When a UPS is used with a computer and its associated peripherals, because of the small area generally available for power cables and signal cables, the cables often times form a "rat's nest" of bunching and bending cables which over time compromise the integrity of the cables.

The operation of a UPS is generally well known, and FIG. 1 shows a typical prior art UPS 10 used to provide regulated uninterrupted power. The UPS 10 includes an input filter/surge protector 12, a transfer switch 14, a controller 16, a battery 18, a battery charger 19, an inverter 20, and a DC-DC converter 23. The UPS also includes an input 24 for coupling to an AC power source and an outlet 26 for coupling to a load.

The UPS 10 operates as follows. The filter/surge protector 12 receives input AC power from the AC power source through the input 24, filters the input AC power and provides filtered AC power to the transfer switch and the battery charger. The transfer switch 14 receives the AC power from the filter/surge protector 12 and also receives AC power from the inverter 20. The controller 16 determines whether the AC power available from the filter/surge protector is within predetermined tolerances, and if so, controls the transfer switch to provide the AC power from the filter/surge protector to the outlet 26. If the AC power from the rectifier is not within the predetermined tolerances, which may occur because of "brown out," "high line," or "black out" conditions, or due to power surges, then the controller controls the transfer switch to provide the AC power from the inverter 20. The DC-DC converter 23 is an optional component that converts the output of the battery to a voltage that is compatible with the inverter. Depending on the particular inverter and battery used the inverter may be operatively coupled to the battery either directly or through a DC-DC converter.

The inverter 20 of the prior art UPS 10 receives DC power from the DC-DC converter 23, converts the DC voltage to AC voltage, and regulates the AC voltage to predetermined specifications. The inverter 20 provides the regulated AC voltage to the transfer switch. Depending on the capacity of the battery and the power requirements of the load, the UPS 10 can provide power to the load during brief power source "dropouts" or for extended power outages.

A major drawback of typical prior art uninterruptible power supplies is that the positioning of electrical outlets in these supplies is typically on the top or back surface of the supply and is generally difficult to plug in power cords from a plurality of electronic components without producing cable bunching and bending.

Portable distribution boxes having an angled surface area dedicated to providing electrical contact are known. One example of a portable distribution box is described in U.S. Pat. No. 2,988,655. However, these prior art portable distribution boxes typically do not provide power surge protection nor do they provide back-up power that may facilitate a gradual shut down of electrical devices connected to the portable distribution box.

SUMMARY OF THE INVENTION

The present invention relates to an uninterruptible power supply (UPS) having a housing that utilizes an angled surface to allow draping of power cables along either side of the housing. In general, the angled surface is a sloped region that has both a horizontal component and a vertical component. The horizontal component of the sloped region facilitates easy access to electrical outlets located on the angled surface. The vertical component of the sloped region facilitates draping power cables towards a back surface of the UPS. In addition, the angled surface further provides a large electrical contact surface area for plugging in a plurality of electronic components. As a result, by utilizing an angled surface that slopes away from a front surface of the UPS, a user can easily access the power cables from the front of the UPS while the cables are orderly draped towards the back of the UPS. Consequently, the present invention reduces the problem of cable bunching and improves the lifetime of the power cables by allowing the cables to drape along the angled surface of the UPS.

In general, in one aspect, the invention features an uninterruptible power supply that provides power to an electrical device, the uninterruptible power supply includes: a first housing; a cover plate that includes a plurality of electrical outlets located on a surface of the cover plate, and the cover plate is connected to the first housing in an angled position; and a battery in electrical communication with the plurality of electrical outlets on the surface of the cover plate. The battery is removably attached to the first housing.

In another aspect, the cover plate is removably connected to the first housing, and is constructed and arranged to accommodate being mated to the first housing. The first housing is constructed and arranged to facilitate power cables being draped along the cover plate. The cover plate includes a plurality of replacement cover plates each constructed and arranged to accommodate being mated to the first housing. The first housing can include a front surface, a back surface, a side surface, a top surface and a bottom surface, and the cover plate can be constructed and arranged to slope from the front surface to the back surface of the uninterruptible power supply. In addition, each replacement cover plate include can be constructed and arranged to accommodate a predetermined power standard which requires electrical outlets which include (but are not limited to) a NEMA 5-15R, an IEC 320, and a BS1363 electrical socket. In one embodiment of the invention, each replacement cover plate includes electrical outlets having the particular geometric configuration that corresponds to the predetermined power standard.

The uninterruptible power supply can also include a plurality of lights distributed on a first angled surface. The first angled surface slopes from the cover plate towards the front surface of the uninterruptible power supply.

In another aspect, the invention relates to a method of manufacturing an uninterruptible power supply, the method includes the steps of: creating a first housing that facilitates power cables being draped along a dimension of the first housing; and providing a plurality of cover plates wherein each cover plate is constructed and arranged to mate with a surface of the first housing; and each cover plate is adapted for a predetermined power standard. The method further includes the step of providing the first housing with an angled surface. The method further includes the step of providing electrical outlets having geometric configurations that correspond to a predetermined power standard.

In yet another aspect, the invention relates to a cover plate for an uninterruptible power supply, the cover plate includes: a plurality of first housings each being removably connected to a second housing; a plurality of electrical outlets distributed on a surface of the first housing; a power cord electrically matched to the plurality of electrical outlets, the power cord being attached to the first housing; and a telephone line connector being located on the first housing. In one embodiment, the power cord is removably connected to the first housing. The plurality of first housings are each removably connected to the second housing of the uninterruptible power supply. In addition, each of the first housings are constructed and arranged to mate with the second housing of the uninterruptible power supply. In another embodiment of the invention, the plurality of electrical outlets distributed on the surface of the first housing includes electrical outlets having specific geometric configurations that correspond to a particular power standard.

In another embodiment, the invention relates to a cover plate for an uninterruptible power supply, the cover plate includes: a first housing; a plurality of electrical outlets distributed on a surface of the first housing; a power cord electrically matched to the plurality of electrical outlets on the surface of the first housing and connected to the first housing; and a telephone line connector located on the first housing. The first housing also includes a connector for a facsimile and a modem. In addition, the plurality of electrical outlets on the surface of the first housing includes electrical outlets having geometric configurations that correspond to a particular power standard.

In another embodiment of the invention, the invention relates to an uninterruptible power supply that provides power to an electrical device, the uninterruptible power supply includes: a first housing having a front surface, a back surface, a side surface, a top surface and a bottom surface; a cover plate that includes a plurality of electrical outlets located on a surface of the cover plate, and said cover plate is connected to the first housing in an angled position; and a battery in electrical communication with the plurality of electrical outlets on the surface of the cover plate, and the battery being removably attached to the first housing. In one embodiment, the back surface can include telephone line connectors. The top surface can include a plurality of electrical outlets that correspond to a predetermined power standard. The top surface may also be removably connected to the front surface and angled downwards towards the back surface of the uninterruptible power supply.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
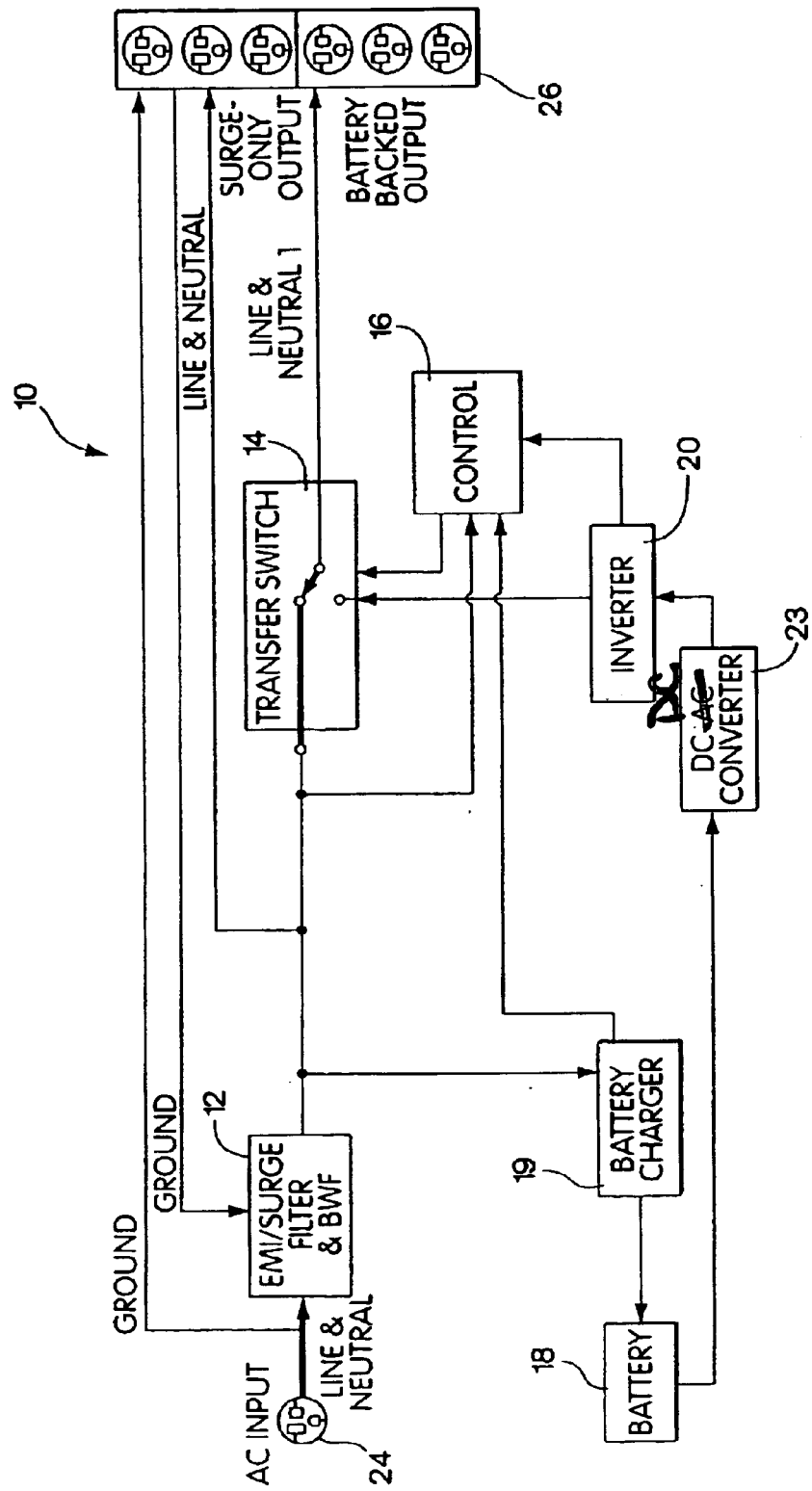
FIG. 1 is a functional block diagram of a typical prior art power supply used to provide regulated uninterrupted power.
Figure 2:
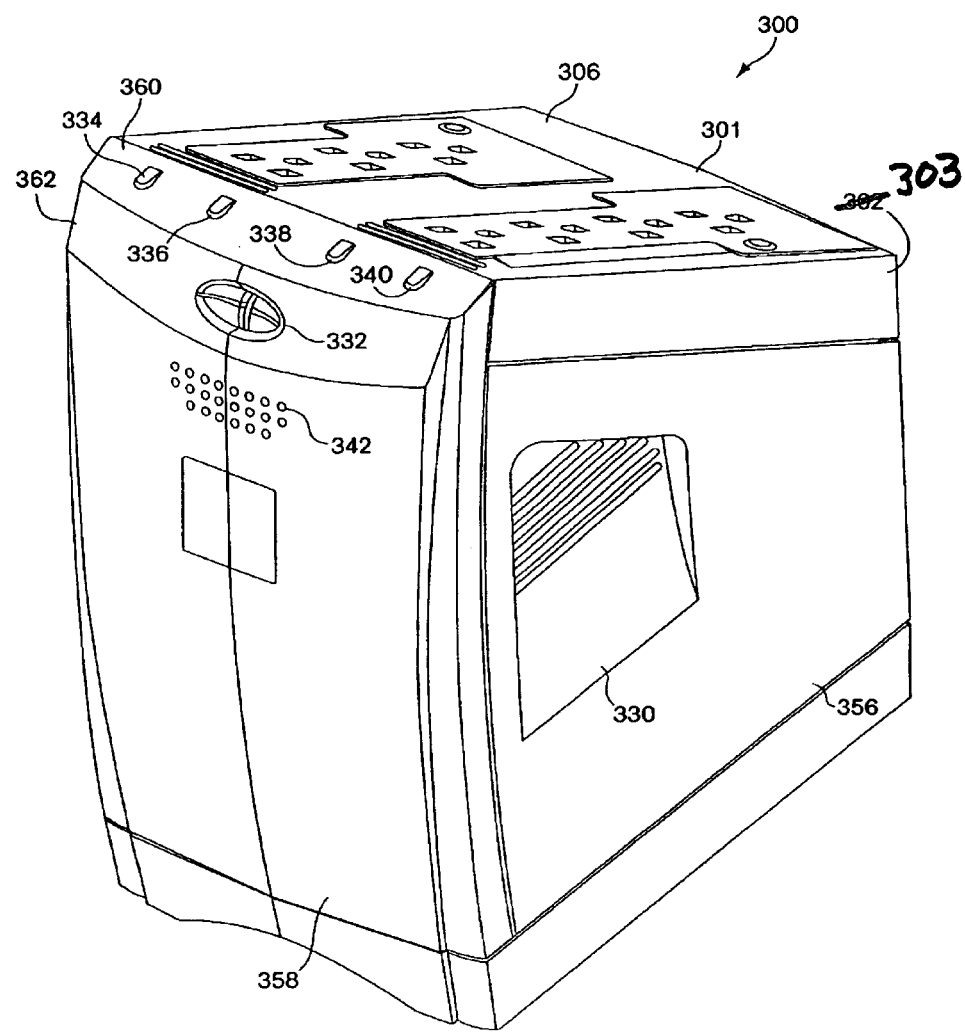
FIG. 2 is a front view of an uninterruptible power supply of the invention.
Figure 3:
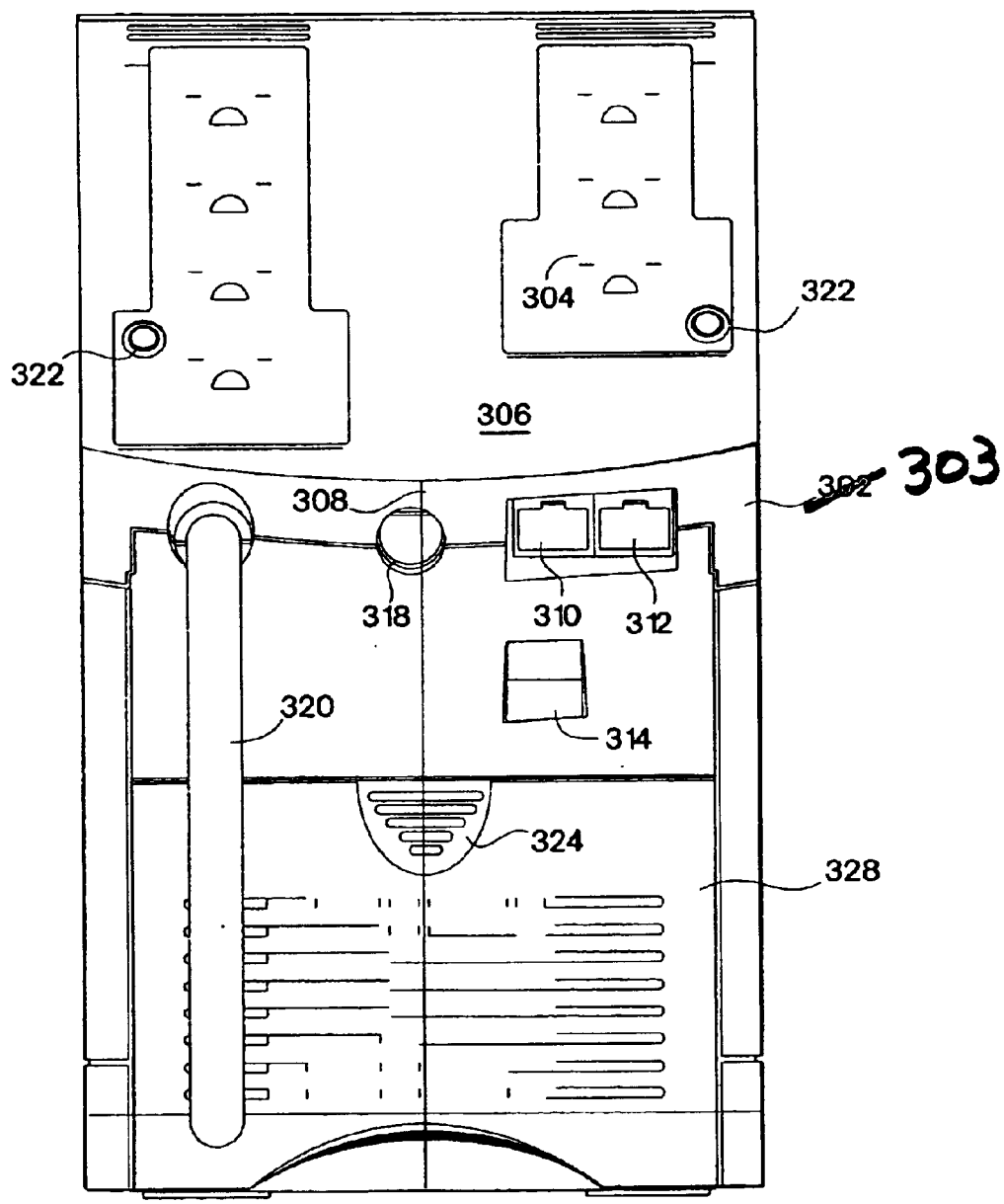
FIG. 3 is a rear view of the uninterruptible power supply of FIG. 2.

One embodiment of an uninterruptible power supply (UPS) in accordance with the present invention will now be described.

A front embodiment of a UPS 300 will now be described with reference to FIGS. 2–5. The uninterruptible power supply includes a housing 301. In one embodiment of the invention, the housing 301 includes a top surface 306, a back surface 303, a symmetrical side surface 356, a curved front surface 358, and a bottom surface. In one embodiment of the invention, the top surface 306 is removably connected to the housing 301. In another embodiment, the top surface 306 extends downwardly from the curved front surface 358 to the back surface 303 of the UPS 300. The top surface 306 is connected to the curved front surface 358 through a first surface 360. The first surface 360 is connected at an angle which opposes the top surface 306. In one embodiment of the invention, the first surface 360 directly abuts the top surface 306. The first surface 360 extends into a second surface 362. The first and second surfaces eventually merge into the curved front surface 358.

The UPS 300 includes a display of four light emitting diodes (LED). The four LEDs are situated on the first surface 360 of the housing 301, and when activated, are viewable in a three hundred sixty degree radius from the housing 301. Specifically, by locating the LEDs on the first surface 360, the lights are ideally positioned such that when the UPS 300 is located beneath a desk, the LEDs are easily viewable to a user seated in front of the UPS. In particular by locating the LEDs on the first surface 360, the lights are ideally positioned such that when the UPS 300 is in operation and located beneath a desk, the LEDs are easily viewable to a user seated at the desk or in any portion of room having an unobstructed view of any top portion of the UPS 300. The LEDs are primarily status indicators of the various states of the UPS 300. In one embodiment of the invention, there is an on/line LED indicator light 334, an on-battery LED indicator light 336, an overload LED indicator light 338, and a replace battery LED indicator light 340.

The on/line LED indicator light 334 powers on when the UPS 300 is plugged in to a wall outlet (not shown) and the power switch 332 is engaged. The on-line indicator light 334 blinks for a period of time while the UPS 300 undergoes a self diagnostic test of all internal components, including the battery. When the self diagnostic is completed, the LED 334 stops blinking.

The on-battery LED indicator light 336 turns-on when electrical devices connected through the cover plate 302 are running on power being supplied by the battery 326. In one embodiment of the invention, the LED indicator light 336 may be accompanied by an alarm emanating from a speaker 342. The alarm provides a user with a secondary alert that the battery power may be low and that all valuable files should be saved or closed. In one embodiment, the alarm sounds intermittently when any equipment connected through the cover plate 302 is using power delivered by the battery. In another embodiment, a continuous alarm signal may be used to indicate that the battery power is low and warns of an impending shutdown.

The overload LED indicator light 338 signifies that a circuit overload has been triggered and that the user should reset the system by engaging the circuit breaker 318 located on the back of the housing 301.

The UPS 300 also includes a power switch 332 located on the second surface 362. In one embodiment, the power switch 332 includes a test switch that automatically analyzes all internal components, including the battery.

In general, the lifetime of the battery is approximately 3-years, and when the lifetime of the battery is spent, the replace battery LED indicator light 340 signifies that the battery should be replaced. In one embodiment, although the indicator light 340 is on, the user still has some time before replacement is absolutely needed. In another embodiment of the invention, another alarm sounds that indicates that the battery lifetime is very short and nearing shutdown. In yet another embodiment, the LED indicator 340 blinks rapidly to indicate that the battery lifetime is very short and nearing shutdown.

In one embodiment of the invention, the housing 301 is a modular housing having a removable cover plate 302. The cover plate 302 includes a plurality of electrical outlets 304 and in one embodiment is implemented using a modular housing. The electrical outlets 304 are shown being distributed along an angled top surface 306 of the UPS housing 301. The angled top surface 306 facilitates a smooth draping of electrical cables towards the back of the UPS 300. The angled top surface 306 also provides a greater surface area for mounting the electrical outlets 304 for a given footprint than the uninterruptible power supplies of the prior art. In addition, the greater surface area facilitates placing a larger circuit board beneath the cover plate 302. The larger circuit board may include a greater number of electronic components which would enable more functional capabilities than the uninterruptible power supplies of the prior art. In another embodiment, the circuit board may be located in another region of the UPS housing 301.

In another embodiment of the invention, the angled top surface 306 may also include a clip, or a tacky substance like VELCRO® to hold the electrical cables in place to further alleviate cable bunching and bending.

In a preferred embodiment, the angled top surface 306 is presented at (but not limited to) a thirty degree angle to provide the maximum surface area available for distributing the electrical outlets 304 on a top surface 306 of the housing 301. At the bottom portion 308 of the angled top surface 306, three receptacles are provided in recessed portions of the housing 301, along with a circuit breaker 318 and a power cord 320.

A first receptacle 310 and a second receptacle 312 are used to provide telephone line surge protection. One of the receptacles may be coupled to a modem or a facsimile connection and the other receptacle may be coupled to a telephone network to provide connection between the telephone network and the modem or facsimile. The first receptacle 310 and the second receptacle 312 may be implemented using standard RJ-45 jacks or other known connectors.

A third receptacle 314 is dedicated to a universal serial bus (USB). In one embodiment of the invention, the USB provides a communications link to a computer or peripheral. The third receptacle facilitates sending an update signal to the peripheral or computer regarding the status of the UPS 300. In the event of a brown out or power surge, the UPS 300 may send a signal that indicates that the main power supply is no longer being supplied at the wall outlet but instead by the battery housed in the UPS 300. As a result, the attached computers or peripherals may take appropriate action to protect any open files and provide for an orderly shutdown.

In another aspect of the invention, the UPS 300 includes monitoring capabilities for site ground faults that may cause electrical shocks or prevent the UPS 300 from adequately suppressing surges. If a ground fault is detected, an LED indicator light located on the power cord adapter is activated.

The UPS housing 301 also includes a circuit breaker 318 located at the bottom portion 308 of the angled top surface 306. The circuit breaker 318 when activated allows the UPS 300 to recover from an electrical overload.

The UPS 300 also includes a door 328. In one embodiment of the invention, the door 328 includes an ergonomically configured thumb inset 324 located at the top portion of the door 328 that facilitates opening the door. The door 328 is slideably connected to the UPS housing 301. When the door 328 is opened by sliding the door through a vertical plane, the battery is exhibited. The battery is in electrical communication with the UPS 300 and is the power source for all electrical devices connected through the cover plate 302 when a power outage, power surge or brown out occurs. The battery is removably connected to the bottom portion of the UPS 300 and may be replaced at any time.

Figure 4:
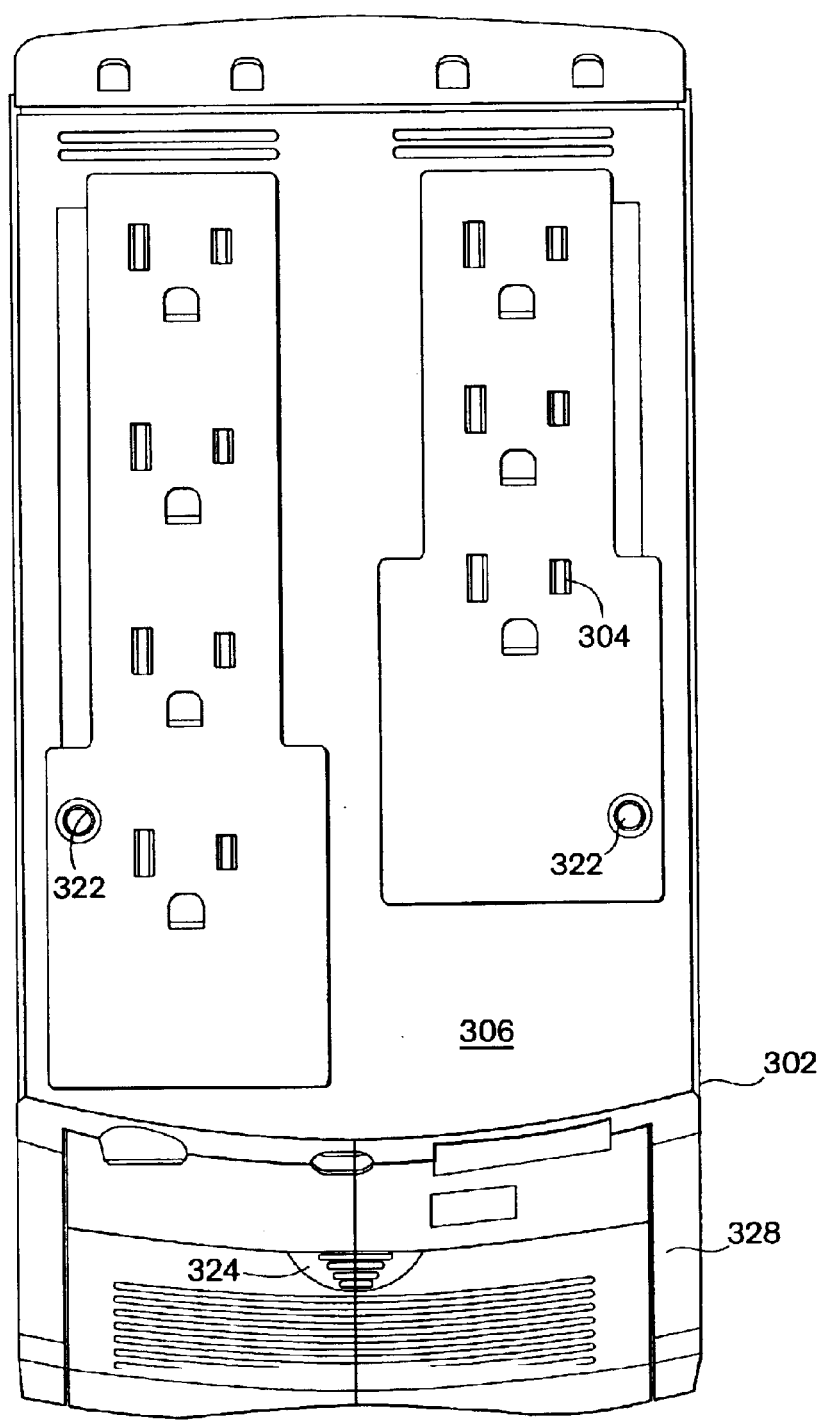
FIG. 4 is a top view of the uninterruptible power supply of FIG. 2.

Referring to FIG. 4, a top view of the UPS 300 is shown. As described above, the electrical outlets 304 are shown distributed along an angled top surface 306 of the housing 301. In one embodiment of the invention, some of the outlets 304 distributed on the top surface 306 may provide power surge protection only, while the remaining outlets 304 may provide both power surge protection and back-up power utilizing the battery. When the cover plate 302 is removed, a printed circuit board (not shown) is exposed. The printed circuit board includes electronic circuitry that in conjunction with other components contained within the UPS housing 301 provides the functions of the UPS described above. In one embodiment, the functions of the UPS 300 may be implemented in accordance with the functional block diagram shown in FIG. 1.

Figure 5:
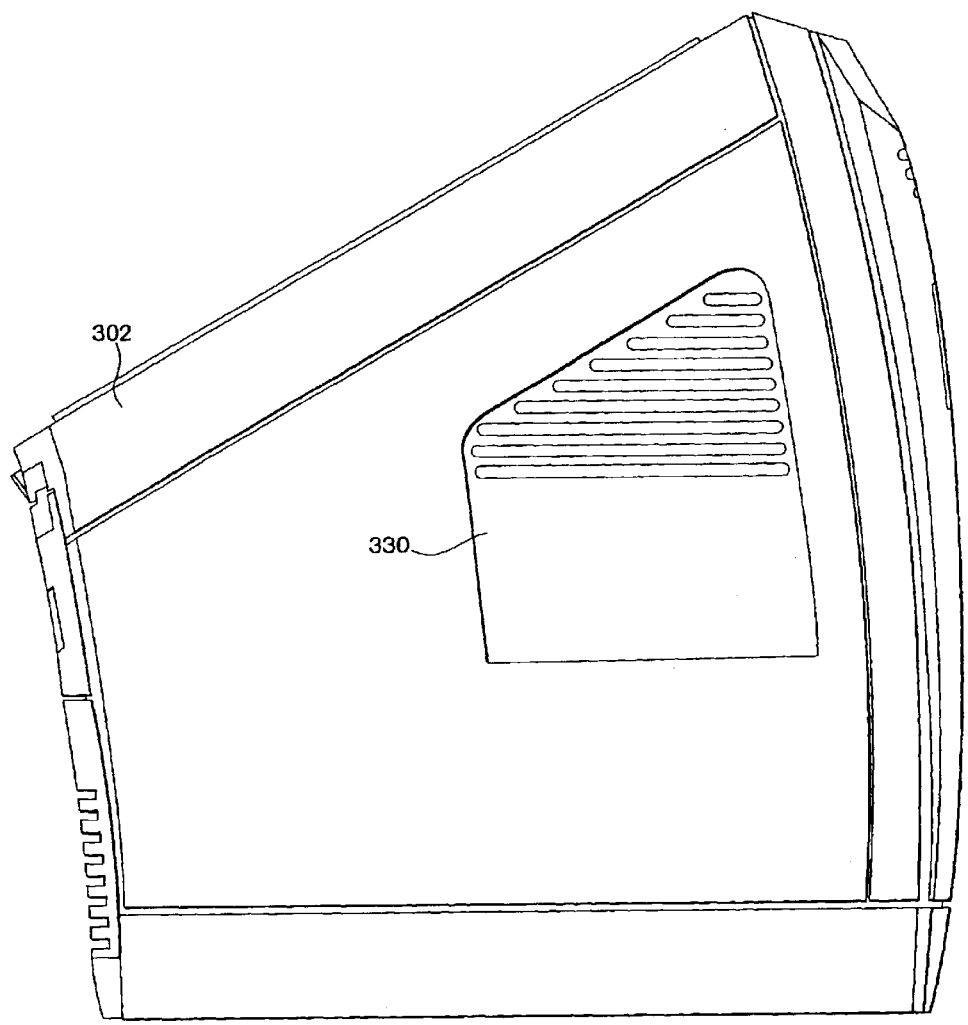
FIG. 5 is a side view of the uninterruptible power supply of FIG. 2.

Referring to FIG. 5, a side view of the UPS 300 is shown. In one embodiment of the invention, a side view shows a vent 330 that provides passive cooling for the UPS 300. The opposite side includes a similar feature that also provides passive cooling to the UPS 300.

Figure 6:
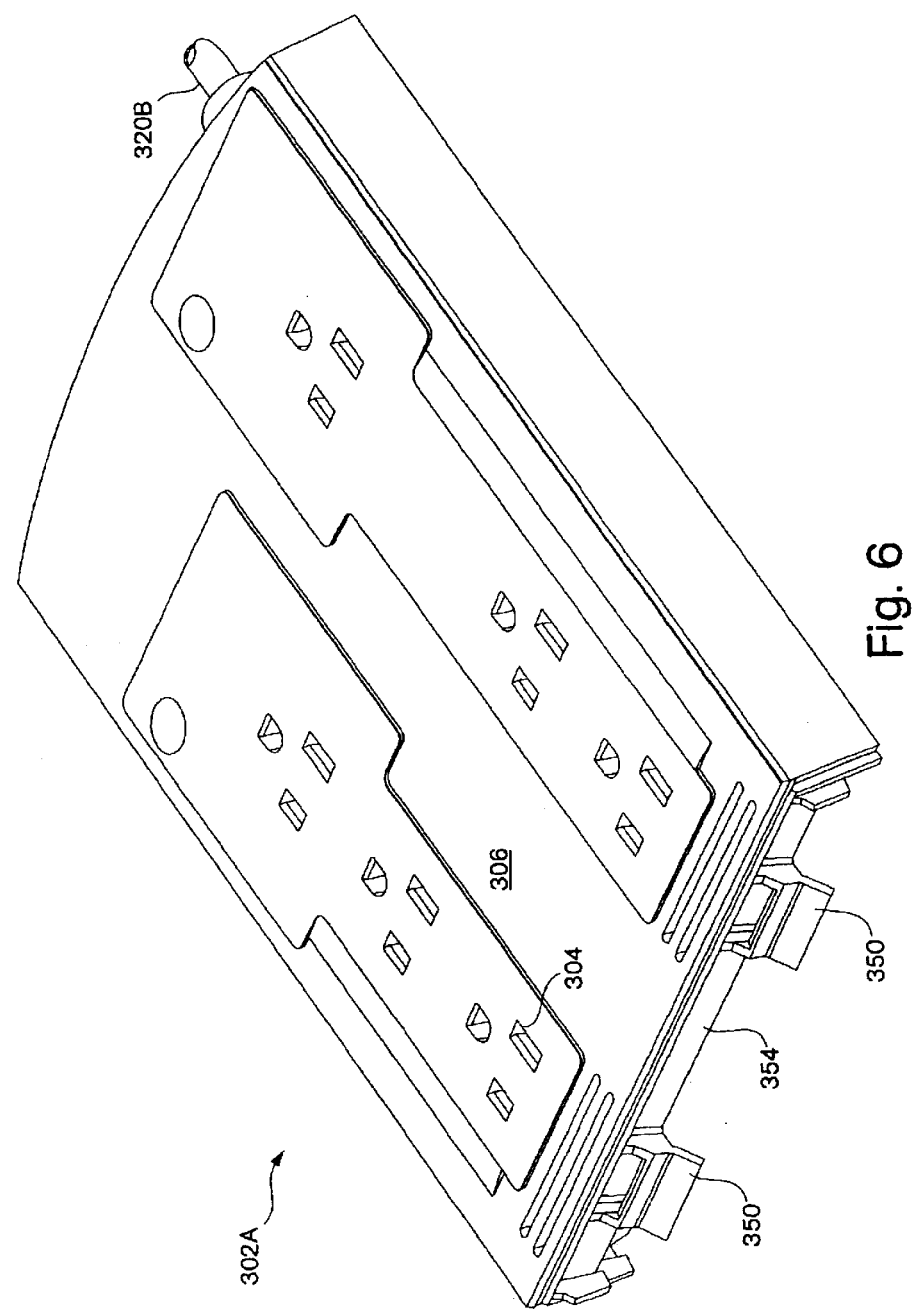
FIG. 6 shows a replacement cover plate used with the uninterruptible power supply of FIG. 2.

In another embodiment of the invention, the cover plate 302 is removable. The cover plate 302 is fastened to the UPS housing 301 by two set screws 322. When the set screws 322 are removed, the cover plate 302 detaches from the housing 301. The cover plate 302 lifts off of the housing 301 along with the power cord 320, the first receptacle 310, the second receptacle 312, the third receptacle 314, and the circuit breaker switch 318. In one embodiment of the invention, the cover plate 302 may be replaced with a replacement cover plate. A replacement cover plate 302A is shown in FIG. 6.

The replacement cover plate 302A may be required when a user is located in a country other than the United States where an electrical wall outlet distributes something other than 120 volts. For example, in Britain a standard wall outlet distributes 240 volts, in France the standard is 220 volts, and in Japan 100 volts. Accordingly, in one embodiment of the invention, a cover plate 302A corresponding to each of the various countries that have voltage requirements and power standards that differ from the United States is provided. The replacement cover plate 302A may also include electrical outlets 304 that correspond to a particular power standard. The power standard may also require that the electrical outlets have a particular geometric shape.

In one embodiment of the invention, the power cord 320 is connected to the housing 301. However, in a preferred embodiment, the power cord 320B is attached to the housing of the cover plate (302, 302A) and allows the replacement cover plate 302A to smoothly re-mate with the UPS housing 301. In one embodiment, each cover plate (302, 302A) is equipped with two locking clips 350. The locking clips 350 are positioned near the top portion 354 of each cover plate. Each locking clip 350 is configured to fit a corresponding connector (not shown). The combination of the locking clip 350 and the corresponding connector facilitates re-mating each cover plate (302, 302A) to the UPS housing 301.

As discussed, the uninterruptible power supply includes a housing 301 that utilizes an angled top surface 306 to allow draping of power cables along either side of the UPS housing 301. The angled top surface 306 provides a large electrical contact surface area for plugging in a plurality of electronic components in a small area. By using an angled top surface 306 that slopes downwardly and away from the front surface 358 of the UPS 300, a user is able to easily access the cables and the outlets 304 from the front of the UPS 300, and the angled surface facilitates the cables draping towards the back of the UPS 300. As a result, the uninterruptible power supply of the present invention reduces the problem of cable bunching and improves the lifetime of the power cables by allowing the cables to drape along a face of the angled top surface 306. In addition, by locating the four LEDs on the first surface 360, the lights are ideally positioned such that when the UPS 300 is in operation and located beneath a desk, the LEDs are easily viewable to a user seated at the desk or in any portion of room having an unobstructed view of a top portion of the UPS 300.

Furthermore, embodiments of the present invention reduce unwanted line noises by tying electronic devices in communication with the UPS to the same grounding plane, while providing electrical continuity through power outages, power surges and brown outs. In addition, embodiments of the present invention protect the devices in electrical communication with phone lines.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. An uninterruptible power supply comprising:
a housing including a top, the top having a first portion that includes a plurality of power outlet receptacles having faces disposed across a first plane, the housing being constructed and arranged to support the uninterruptible power supply on a surface defined by a surface plane such that the first plane is at an oblique angle relative to the surface plane;
an input to receive input electrical power from a power source;
a battery disposed within the housing; and
a circuit board contained within the housing and disposed beneath the top of the housing, the circuit board being coupled to the input, to the battery, and to at least one of the plurality of power outlet receptacles to provide output electrical power derived from one of the input electrical power and the battery, the circuit board having a component surface on which at least one component is mounted, the component surface being disposed along a second plane that is parallel to the first plane.

2. The uninterruptible power supply of claim 1, wherein the top of the housing has a second portion having at least one indicator light that is coupled to the circuit board.

3. The uninterruptible power supply of claim 2, wherein the at least one indicator light is a plurality of indicator lights having faces disposed across a third plane that is at an oblique angle relative to the surface plane.

4. The uninterruptible power supply of claim 3, wherein the third plane is at an oblique angle relative to the first plane.

5. The uninterruptible power supply of claim 4, wherein the battery is removably contained in a battery compartment in the housing.

6. The uninterruptible power supply of claim 5, wherein the housing has a back surface having a face that is substantially perpendicular to the surface plane.

7. The uninterruptible power supply of claim 6, having a power cord coupled to the back surface face.

8. An uninterruptible power supply comprising:
a housing including a top, the top having a first portion and a second portion, the first portion including a plurality of power outlet receptacles having faces disposed across a first plane, the housing being constructed and arranged to support the uninterruptible power supply on a surface defined by a surface plane such that the first plane is at an oblique angle relative to the surface plane;
a circuit board contained within the housing and coupled to at least one of the plurality of power outlet receptacles;
an input to receive input electrical power from a power source;
a battery disposed within the housing;
an output to provide output electrical power derived from one of the input electrical power and the battery to the circuit board; and
a plurality of indicator lights coupled to the circuit board and mounted on the second portion of the top across a third plane that is at an oblique angle relative to the surface plane.

9. The uninterruptible power supply of claim 8, wherein the third plane is at an oblique angle relative to the first plane.

10. The uninterruptible power supply of claim 8, further including at least one telephone connector mounted on a back surface of the housing.

11. The uninterruptible power supply of claim 8, further including at least one universal serial bus (USB) connecter mounted on a back surface of the housing.

12. The uninterruptible power supply of claim 8, wherein at least a portion of the top is removable from the housing.

13. The uninterruptible power supply of claim 8, further including a power switch mounted on a front face of the housing.

14. The uninterruptible power supply of claim 13, wherein the power switch includes a test switch to test at least one characteristic of the battery.

15. An uninterruptible power supply comprising:
- a housing being constructed and arranged to support the uninterruptible power supply on a surface defined by a surface plane, the housing including:
- a back surface having a height and having a face that is substantially perpendicular to the surface plane;
- a front surface having a height and having a face that is substantially perpendicular to the surface plane, wherein the height of the front surface is greater than the height of the back surface; and
- a top, coupled to the back surface and to the front surface, the top including a first portion that includes a plurality of power outlet receptacles having faces disposed across a first plane;
- an input to receive input electrical power from a power source;
- a battery disposed within the housing; and
- a circuit board contained within the housing and disposed beneath the top of the housing, the circuit board being coupled to the input, to the battery, and to at least one of the plurality of power outlet receptacles to provide output electrical power derived from one of the input electrical power and the battery, the circuit board having a component surface on which at least one component is mounted, the component surface being disposed along a second plane that is parallel to the first plane.

16. The uninterruptible power supply of claim 15, wherein the top of the housing further includes a second portion having at least one indicator light that is coupled to the circuit board.

17. The uninterruptible power supply of claim 16, wherein the at least one indicator lights is a plurality of indicator lights having faces disposed across a third plane that is at an oblique angle relative to the surface plane.

18. The uninterruptible power supply of claim 17, wherein the third plane is at an oblique angle relative to the first plane.

19. The uninterruptible power supply of claim 15, wherein the battery is removably contained in a battery compartment in the housing.

20. The uninterruptible power supply of claim 15, further including at least one telephone connector mounted on the back surface face of the housing.

21. The uninterruptible power supply of claim 15, further including at least one universal serial bus (USB) connector mounted on the back surface face of the housing.

22. An uninterruptible power supply comprising:
- a housing being constructed and arranged to support the uninterruptible power supply on a surface defined by a surface plane, the housing including:
- a back surface having a height and having a face that is substantially perpendicular to the surface plane;
- a front surface having a height and having a face that is substantially perpendicular to the surface plane, wherein the height of the front surface is greater than the height of the back surface; and
- a top, coupled to the back surface and to the front surface, the top having a first portion and a second portion, the first portion including a plurality of power outlet receptacles having faces disposed across a first plane;
- a circuit board contained within the housing and coupled to at least one of the plurality of power outlet receptacles;
- an input to receive input electrical power from a power source and coupled to the circuit board to provide outlet electrical power to the circuit board;
- a battery disposed within the housing and coupled to the circuit board; and
- a plurality of indicator lights coupled to the circuit board and mounted on the second portion of the top across a third plane that is at an oblique angle relative to the surface plane.

23. The uninterruptible power supply of claim 22, wherein the third plane is at an oblique angle relative to the first plane.

24. The uninterruptible power supply of claim 22, wherein at least a portion of the top is removable from the housing.

25. The uninterruptible power supply of claim 22, further including a power switch mounted on the front surface face of the housing.

26. The uninterruptible power supply of claim 25, wherein the power switch includes a test switch to test at least one characteristic of the battery.

* * * * *